(12) United States Patent
Morita et al.

(10) Patent No.: US 8,178,642 B2
(45) Date of Patent: May 15, 2012

(54) CURABLE ORGANOPOLYSILOXANE COMPOSITION AND CURED PRODUCT THEREOF

(75) Inventors: Yoshitsugu Morita, Ichihara (JP); Michitaka Suto, Midland, MI (US)

(73) Assignee: Dow Corning Toray Company, Ltd., Tokyo (JP)

( * ) Notice: Subject to any disclaimer, the term of this patent is extended or adjusted under 35 U.S.C. 154(b) by 11 days.

(21) Appl. No.: 12/935,079

(22) PCT Filed: Mar. 11, 2009

(86) PCT No.: PCT/JP2009/055361
§ 371 (c)(1),
(2), (4) Date: Dec. 10, 2010

(87) PCT Pub. No.: WO2009/122917
PCT Pub. Date: Oct. 8, 2009

(65) Prior Publication Data
US 2011/0092647 A1    Apr. 21, 2011

(30) Foreign Application Priority Data
Mar. 31, 2008 (JP) .................... 2008-091549

(51) Int. Cl.
C08G 77/12 (2006.01)
C08G 77/04 (2006.01)
C08L 83/04 (2006.01)

(52) U.S. Cl. ............... 528/31; 528/32; 528/33; 525/100
(58) Field of Classification Search ............. 528/31
See application file for complete search history.

(56) References Cited

U.S. PATENT DOCUMENTS

| | | | |
|---|---|---|---|
| 4,886,865 A * | 12/1989 | Ikeno et al. | 528/15 |
| 5,087,720 A * | 2/1992 | Kishita et al. | 556/434 |
| 5,239,035 A * | 8/1993 | Maxson | 528/15 |
| 5,281,656 A * | 1/1994 | Thayer et al. | 524/601 |
| 5,714,265 A * | 2/1998 | Meguriya et al. | 428/413 |
| 7,282,270 B2 * | 10/2007 | Morita et al. | 428/447 |
| 7,705,104 B2 * | 4/2010 | Yamakawa et al. | 528/31 |
| 2001/0053840 A1 * | 12/2001 | Ko et al. | 528/36 |
| 2002/0161140 A1 * | 10/2002 | Yoneda et al. | 526/90 |
| 2004/0116640 A1 * | 6/2004 | Miyoshi | 528/12 |
| 2005/0129957 A1 * | 6/2005 | Kashiwagi et al. | 428/413 |
| 2007/0073026 A1 * | 3/2007 | Miyoshi | 528/15 |
| 2011/0028635 A1 * | 2/2011 | Cauvin et al. | 524/506 |

FOREIGN PATENT DOCUMENTS

| | | |
|---|---|---|
| EP | 1767580 A1 | 3/2007 |
| JP | 2002-088155 A | 3/2002 |
| JP | 2004-186168 A | 7/2004 |
| JP | 2005-327777 A | 11/2005 |
| JP | 2007-063538 A | 3/2007 |
| JP | 2007-084766 A | 4/2007 |
| JP | 2007-182549 A | 7/2007 |
| WO | WO 2007-148812 A1 | 12/2007 |

OTHER PUBLICATIONS

English language translation and abstract for JP 2002-0088155 extracted from PAJ database Mar. 25, 2011, 44 pages.
English language translation and abstract for Jp 2004-186168 extracted from PAJ database Mar. 25, 2011, 29 pages.
English language translation and abstract for JP 2005-327777 extracted from PAJ database Mar. 25, 2011, 33 pages.
English language translation and abstract for JP 2007-063538 extracted from PAJ database Mar. 25, 2011, 50 pages.
English language translation and abstract for JP 2007-084766 extracted from PAJ database Mar. 25, 2011, 44 pages.
English language translation and abstract for JP 2007-182549 extracted from PAJ database Mar. 25, 2011, 39 pages.
PCT International Search Report for PCT/JP2009/055361 dated May 15, 2009, 3 pages.

* cited by examiner

*Primary Examiner* — Robert S Loewe
(74) *Attorney, Agent, or Firm* — Howard & Howard Attorneys PLLC

(57) ABSTRACT

A curable organopolysiloxane composition comprising: (A) a solvent-soluble organopolysiloxane obtained by conducting a hydrosilylation reaction between (i) an organopolysiloxane represented by the following average structural formula: $R_aSiO_{(4-a)/2}$ (wherein $R^1$ represents a substituted or non-substituted monovalent hydrocarbon group, the content of alkenyl groups in all groups represented by $R^1$ is within the range of 0.1 to 40 mole %, and 'a' is a positive number that satisfies the following condition: $1 \leq a < 2$), and (ii) a diorganopolysiloxane represented by the following general formula: $HR^2_2Si(R^2_2SiO)_nR^2_2SiH$ (wherein $R^2$ designates substituted or unsubstituted monovalent hydrocarbon groups that can be identical or different and that are free of unsaturated aliphatic bonds, and 'n' is an integer ranging from 0 to 1,000), the reaction being carried out in the presence of (iii) a hydrosilylation catalyst; (B) an organohydrogenpolysiloxane represented by the following average structural formula: $R^2_bH_cSiO$ (wherein $R^2$ is the same as defined above, and 'b' and 'c' are positive numbers that satisfy the following conditions: $0.7 \leq b \leq 2.1$; $0.001 \leq c \leq 1.0$; and $0.8 \leq (b+c) \leq 2.6$); and (C) a hydrosilylation catalyst; is suitable for forming a cure product having a favorable modulus of elasticity.

11 Claims, No Drawings

CURABLE ORGANOPOLYSILOXANE COMPOSITION AND CURED PRODUCT THEREOF

RELATED APPLICATIONS

This application claims priority to and all the advantages of International Patent Application No. PCT/JP2009/055361, filed on Mar. 11, 2009, which claims priority to Japanese Patent Application No. JP 2008-091549, filed on Mar. 31, 2008.

TECHNICAL FIELD

The present invention relates to a curable organopolysiloxane composition and to a cured product obtained by curing the composition.

BACKGROUND ART

Japanese Unexamined Patent Application Publications (hereinafter referred to as "Kokai") 2004-186168 and 2005-327777 disclose curable organopolysiloxane compositions comprising: a branched organopolysiloxane or an oganopolysiloxane having a three-dimensional network structure (hereinafter referred to as "a three-dimensionally networked organopolysiloxane") that contains in one molecule at least two alkenyl groups; an organohydrogenpolysiloxane having in one molecule at least 2 silicon-bonded hydrogen atoms; and a hydrosilylation catalyst. Since curing of these curable organopolysiloxane compositions forms cured products of high hardness, the compositions find application as protective-coating agents in the manufacture of photocouplers, LEDs, solid-state image sensors, or similar semiconductor elements used in optical semiconductor devices.

However, cured products obtained from the aforementioned known compositions have a high modulus of elasticity and, therefore, have low resistance to thermal shocks and poor adhesive properties. It was proposed, as disclosed in Kokai 2007-063538, 2007-084766, and 2007-182549, to reduce the modulus of elasticity of cured products by introducing linear segments of a diorganopolysiloxane into the branched or three-dimensionally networked organopolysiloxane that contains in one molecule at least two alkenyl groups. In order to introduce linear segments of a diorganopolysiloxane into the branched or three-dimensionally networked organopolysiloxane that contains in one molecule at least two alkenyl groups, it was necessary to produce a diorganopolysiloxane capped at both molecular terminals with diorganochlorosilyl groups by causing a hydrosilylation reaction between a vinyldiorganochlorosilane and a diorganopolysiloxane capped at both molecular terminals with silicon-bonded hydrogen atoms. The obtained diorganopolysiloxane is subjected to co-hydrolysis and condensation with an organotrichlorosilane or a triorganochlorosilane, or a similar chlorosilane, in the presence of an alkali catalyst. However, the organopolysiloxane obtained by the above method contains residual chlorine ions. Furthermore, the alkali catalyst leads to re-arrangement of the linear segments, while the modulus of elasticity of cured products is reduced only insignificantly.

On the other hand, Kokai 2002-088155 discloses a condensation-curable organopolysiloxane composition comprising: an organopolysiloxane that contains silicon-bonded alkoxy groups and is obtained by subjecting a branched or three-dimensionally networked organopolysiloxane having in one molecule at least one alkenyl group and a silicon-bonded alkoxy group and a diorganopolysiloxane capped at both molecular terminals with silicon-bonded hydrogen atoms to a hydrosilylation reaction; a silicon-bonded alkoxysilane; and a condensation catalyst. The last-mentioned reference, however, does not disclose a curable organopolysiloxane composition which is cured by hydrosilylation.

It is an object of the invention to provide a curable organopolysiloxane composition for forming cured products having a favorable modulus of elasticity. It is another object to provide a cured product that has a favorable modulus of elasticity.

DISCLOSURE OF INVENTION

The invention provides a curable organopolysiloxane composition comprising:

(A) a solvent-soluble organopolysiloxane obtained by conducting a hydrosilylation reaction between
  (i) an organopolysiloxane that contains in one molecule at least two alkenyl groups and is represented by the following average structural formula:

$$R^1_a SiO_{(4-a)/2}$$

(wherein $R^1$ represents a substituted or non-substituted monovalent hydrocarbon group, the content of alkenyl groups in all groups represented by $R^1$ is within the range of 0.1 to 40 mole %, and "a" is a positive number that satisfies the following condition: $1 \leq a < 2$), and
  (ii) a diorganopolysiloxane represented by the following general formula:

$$HR^2_2 SiO(R^2_2 SiO)_n R^2_2 SiH$$

(wherein $R^2$ designates substituted or unsubstituted monovalent hydrocarbon groups that can be identical or different and that are free of unsaturated aliphatic bonds, and "n" is an integer ranging from 0 to 1,000) {constituent (ii) is used in such an amount that the content of silicon-bonded hydrogen atoms of this constituent is less than 1 mole per 1 mole of alkenyl groups of constituent (i)}, the reaction being carried out in the presence of (iii) a hydrosilylation catalyst;

(B) an organohydrogenpolysiloxane represented by the following average structural formula:

$$R^2_b H_c SiO_{(4-b-c)/2}$$

(wherein $R^2$ is the same as defined above, and "b" and "c" are positive numbers that satisfy the following conditions: $0.7 \leq b \leq 2.1$; $0.001 \leq c \leq 1.0$; and $0.8 \leq (b+c) \leq 2.6$) {component (B) is used in such an amount that the content of silicon-bonded hydrogen atoms of this component is in the range of 0.1 to 10 moles per 1 mole of alkenyl groups of component (A)}; and (C) a hydrosilylation catalyst used in a catalytic amount.

The content of aryl groups in all groups represented by $R^1$ of constituent (i) may be at least 10 mole %. The groups represented by $R^2$ of constituent (ii) may be methyl groups.

Preferably, constituent (ii) should participate in reaction with constituent (i) in such an amount that 0.05 to 0.95 moles of silicon-bonded hydrogen atoms of constituent (ii) are used per 1 mole of alkenyl groups of constituent (i).

The cured product of the invention is obtained by curing the above-mentioned curable organopolysiloxane composition.

EFFECTS OF INVENTION

The curable organopolysiloxane composition of the invention is characterized by making it possible to form a cured product having a favorable modulus of elasticity. The cured product of the invention is characterized by having a favorable modulus of elasticity.

DETAILED DESCRIPTION OF THE INVENTION

Solvent-soluble organopolysiloxane (A) is a main component of the composition. This component is obtained by conducting a hydrosilylation reaction between
(i) an organopolysiloxane that contains in one molecule at least two alkenyl groups and is represented by the following average structural formula:

$$R^1_a SiO_{(4-a)/2}$$

(wherein $R^1$ represents a substituted or non-substituted monovalent hydrocarbon group, the content of alkenyl groups in all groups represented by $R^1$ is within the range of 0.1 to 40 mole %, and "a" is a positive number that satisfies the following condition: $1 \leq a < 2$), and
(ii) a diorganopolysiloxane represented by the following general formula:

$$HR^2_2SiO(R^2_2SiO)_n R^2_2SiH$$

(wherein $R^2$ designates substituted or unsubstituted monovalent hydrocarbon groups that can be identical or different and that are free of unsaturated aliphatic bonds, and "n" is an integer ranging from 0 to 1,000) {constituent (ii) is used in such an amount that the content of silicon-bonded hydrogen atoms of this constituent is less than 1 mole per 1 mole of alkenyl groups of constituent (i)},
the reaction being carried out in the presence of (iii) a hydrosilylation catalyst.

The organopolysiloxane of constituent (i) is represented by the following average structural formula:

$$R^1_a SiO_{(4-a)/2}$$

In this formula, $R^1$ represents a substituted or non-substituted monovalent hydrocarbon group that has 1 to 12 carbon atoms and, preferably, 1 to 8 carbon atoms. Specific examples of this group are the following: a methyl, ethyl, propyl, isopropyl, butyl, isobutyl, tert-butyl, pentyl, neopentyl, hexyl, cyclohexyl, octyl, nonyl, decyl, or a similar alkyl group; a vinyl, allyl, isopropenyl, butenyl, pentenyl, hexenyl, cyclohexenyl, octenyl, or a similar alkenyl group; a phenyl, tolyl, xylyl, naphthyl, or a similar aryl group; benzyl, phenethyl, phenylpropyl, or a similar aralkyl group; as well as the aforementioned groups, in which the hydrogen atoms are partially or completely substituted with fluorine, bromine, chlorine, or other halogen atoms, or cyano groups. Specific examples are the following: a chloromethyl, chloropropyl, bromoethyl, trifluoropropyl, or a similar halogen-substituted alkyl group or a cyanoethyl group.

In one molecule, at least two groups represented by $R^1$ are alkenyl groups. It is recommended that the content of alkenyl groups constitute 0.1 to 40 mole %, preferably 0.5 to 40 mole %, and most preferably, 1 to 30 mole % of all groups represented by $R^1$. Such alkenyl groups may be represented by vinyl or allyl groups. For improving optical transmittance of the cured product obtained by curing the composition, it is recommended that the content of aryl groups constitute at least 10 mole % of the groups represented by $R^1$. The preferable aryl groups are phenyl groups.

In the above formula, "a" is a positive number that satisfies the following condition: $1 \leq a < 2$, preferably, $1 \leq a \leq 1.8$, and most preferably, $1 \leq a \leq 1.5$. Constituent (i) has a branched or a three-dimensionally networked molecular structure, and there are no special restrictions with regard to the state of this constituent at 25° C. For example, it can be a solid substance or a liquid substance with viscosity equal to or exceeding 10 mPa·s.

The diorganopolysiloxane of constituent (ii) is represented by the following general formula:

$$HR^2_2SiO(R^2_2SiO)_n R^2_2SiH$$

In this formula, $R^2$ designates substituted or unsubstituted monovalent hydrocarbon groups that can be identical or different and that are free of unsaturated aliphatic bonds. These groups contain 1 to 12 carbon atoms, and preferably 1 to 8 carbon atoms. Specific examples are the following: a methyl, ethyl, propyl, isopropyl, butyl, isobutyl, tert-butyl, pentyl, neopentyl, hexyl, cyclohexyl, octyl, nonyl, decyl, or a similar alkyl group; a phenyl, tolyl, xylyl, naphthyl, or a similar aryl group; benzyl, phenethyl, phenylpropyl, or a similar aralkyl group; as well as the aforementioned groups, in which the hydrogen atoms are partially or completely substituted with fluorine, bromine, chlorine, or other halogen atoms, or cyano groups. Specific examples are the following: a chloromethyl, chloropropyl, bromoethyl, trifluoropropyl, or a similar halogen-substituted alkyl group or a cyanoethyl group. $R^2$ is preferably an alkyl group, most preferably, a methyl group.

In the above formula, "n" is an integer ranging from 0 to 1,000, preferably, from 3 to 1,000, more preferably, from 3 to 500, most preferably, from 3 to 100, and even from 3 to 50. If "n" is lower than the recommended lower limit, it will be difficult to obtain a cured product with low modulus of elasticity. If, on the other hand, the value of "n" exceeds the recommended upper limit, this will either impair handleability of the obtained organopolysiloxane or reduce mechanical strength of a cured product obtained from the composition. Although there are no special restrictions with regard to viscosity of constituent (ii) at 25° C., it is recommended that the viscosity be in the range of 0.1 to 10,000 mPa·s.

Constituent (ii) participates in reaction with constituent (i) in such an amount that 0.05 to 0.95 moles, preferably 0.1 to 0.95 moles, and most preferably, 0.2 to 0.8 moles of silicon-bonded hydrogen atoms of constituent (ii) are used per 1 mole of alkenyl groups of constituent (i). This is necessary for restricting gelling of the obtained organopolysiloxane and for preserving alkenyl groups.

The hydrosilylation catalyst of constituent (iii) is used as a catalyst for the hydrosilylation reaction between constituents (i) and (ii). Constituent (iii) is represented by platinum-type catalysts, rhodium-type catalysts, or palladium-type catalysts. The platinum-type catalyst provides most significant acceleration of the hydrosilylation reaction. The platinum-type catalyst can be represented by a finely powdered platinum, chloroplatinic acid, an alcohol solution of a chloroplatinic acid, a platinum-alkenylsiloxane complex, platinum-olefin complex, or a platinum-carbonyl complex. The most preferable is the platinum-alkenylsiloxane complex, which can be exemplified by 1,3-divinyl-1,1,3,3-tetramethyl disiloxane, 1,3,5,7-tetramethyl-1,3,5,7-tetravinylcyclotetrasiloxane, the aforementioned alkenylsiloxanes having a part of their methyl groups substituted with ethyl, phenyl, or similar groups, or the aforementioned alkenylsiloxane having their vinyl groups substituted with allyl, hexenyl, or similar groups.

In terms of weight units, constituent (iii) is used in an amount of 0.01 to 1,000 ppm of the catalytic metal contained in this constituent per total weight of constituents (i) and (ii). More preferable content is 0.1 to 500 ppm. If constituent (iii) is contained in an amount less than the recommended lower limit, it will be difficult to accelerate the hydrosilylation reaction. If, on the other hand, the content of constituent (iii) exceeds the recommended upper limit, this may cause coloring of the obtained organopolysiloxane.

There are no special restrictions with regard to conditions of the hydrosilylation reaction, and the reaction can be accelerated by heating. When the reaction system contains a solvent such as toluene, xylene, or a similar aromatic-type solvent, or heptane, hexane, or a similar aliphatic-type solvent, it is recommended that the reaction temperature be the reflux temperature of the solvent. If the system is free of an organic solvent, the reaction temperature may be equal to or below 200° C. By adding an organic solvent, it will be possible to reduce the viscosity of the reaction system and to dehydrate the reaction system by removing water due to azeotropy.

The organopolysiloxane of component (A) obtained as described above can be introduced into the branched or three-dimensionally networked organopolysiloxane without re-arrangement of linear segments of diorganopolysiloxane. Such component (A) can be dissolved in toluene, xylene, or a similar aromatic-type solvent; or in heptane, hexane, or a similar aliphatic-type solvent. There are no special restrictions with regard to the state of component (A) at 25° C., and it can be in the form of a liquid, viscous, or solid substance. More specifically, the appearance of component (A) will be different depending on difference in compatibility of constituents (i) and (ii) and their content ratio. Furthermore, if constituent (i) has a low molecular weight or is used in a reduced amount, component (A) will comprise a transparent or semi-transparent solid body. If constituent (i) is a macromolecule or is used in an increased amount, component (A) will become a semitransparent gum or a gum with white turbidity. There are no special restrictions with regard to the molecular weight of component (A), but for better handleability and solubility in a solvent, it is recommended to have a polystyrene-referenced weight-average molecular weight determined by gel permeation chromatography in the range of 500 to 100,000, and preferably in the range of 1,000 to 50,000.

The organohydrogenpolysiloxane of component (B) is a cross-linking agent of the composition of the invention. This component is represented by the following average structural formula:

$$R^2{}_b H_c SiO_{(4-b-c)/2}$$

In this formula, $R^2$ designates substituted or unsubstituted monovalent hydrocarbon groups that can be identical or different and that can be exemplified by the same groups that are given for this designation above. In the formula, "b" and "c" are positive numbers that satisfy the following conditions: $0.7 \leq b \leq 2.1$; $0.001 \leq c \leq 1.0$; and $0.8 \leq (b+c) \leq 2.6$, and preferably, the following conditions: $0.8 \leq b \leq 2$; $0.01 \leq c \leq 1$; and $1 \leq (b+c) \leq 2.4$.

There are no special restrictions with regard to the molecular structure of component (B), which can be a linear, partially-branched linear, branched, or a three-dimensionally networked molecular structure. The state of component (B) at 25° C. may be solid or liquid. Preferably, this component should have viscosity equal to or below 10,000 mPa·s, more preferably, in the range of 0.1 to 5,000 mPa·s, and most preferably, in the range of 0.5 to 1,000 mPa·s.

The organohydrogenpolysiloxane of component (B) can be exemplified by the following compounds: a methylhydrogenpolysiloxane capped at both molecular terminals with trimethylsiloxy groups, a copolymer of a dimethylsiloxane and a methylhydrogensiloxane capped at both molecular terminals with trimethylsiloxy groups, a dimethylpolysiloxane capped at both molecular terminals with dimethylhydrogensiloxy groups, a copolymer of a dimethylsiloxane and a methylhydrogensiloxane capped at both molecular terminals with dimethylhydrogensiloxy groups, a copolymer of a methylhydrogensiloxane and a diphenylsiloxane capped at both molecular terminals with trimethylsiloxy groups, a copolymer of a dimethylsiloxane, a diphenylsiloxane, and a methylhydrogensiloxane capped at both molecular terminals with trimethylsiloxy groups, a copolymer composed of $(CH_3)_2HSiO_{1/2}$ units and $SiO_{4/2}$ units, and a copolymer composed of $(CH_3)_2HSiO_{1/2}$ units, $SiO_{4/2}$ units, and $(C_6H_5)SiO_{3/2}$ units.

Component (B) is used in such an amount that the content of silicon-bonded hydrogen atoms of this component is in the range of 0.1 to 10 moles, preferably 0.1 to 5 moles, and, most preferably, 0.5 to 5 moles per 1 mole of alkenyl groups of component (A). If component (B) is used in an amount less than the recommended lower limit, the composition will not be cured to a sufficient degree. If, on the other hand, the content of component (B) exceeds the recommended upper limit, this may impair mechanical properties of a cured product of the composition.

The hydrosilylation catalyst of component (C) is used for accelerating cross-linking caused by hydrosilylation reaction between components (A) and (B). This catalyst is exemplified by the same examples that were given above with reference to constituent (iii). In the present composition, component (C) is used in a catalytic amount. More specifically, in terms of weight units, component (C) is added in an amount of 0.01 to 1,000 ppm, preferably 0.1 to 500 ppm of the catalytic metal contained in this constituent per total weight of components (A) and (B). If component (C) is contained in an amount less than the recommended lower limit, it will be difficult to accelerate the hydrosilylation reaction. If, on the other hand, the content of component (C) exceeds the recommended upper limit, this may cause coloring of the obtained cured product.

The composition of the invention may contain an optional component in the form of an organopolysiloxane such as aforementioned constituent (i) that contains in one molecule at least two alkenyl groups. There are no special restrictions with regard to the amounts in which this organopolysiloxane can be used. It may be, however, recommended to add this compound in the amount of 0.1 to 100 parts by weight per 100 parts by weight of component (A).

Other optional components of the composition may be exemplified by 3-methyl-1-butyn-3-ol, 3,5-dimethyl-1-hexyn-3-ol, phenylbutynol, or a similar alkyne alcohol; 3-methyl-3-penten-1-yne, 3,5-dimethyl-3-hexen-1-yne, or a similar enyne compound; 1,3,5,7-tetramethyl-1,3,5,7-tetravinyl cyclotetrasiloxane, 1,3,5,7-tetramethyl-1,3,5,7-tetrahexenyl cyclotetrasiloxane, and benzotriazole, or a similar reaction inhibitor. There are no special restrictions with regard to the amount in which such reaction inhibitors can be added, but in general, it is recommended that the added amount be in the range of 0.0001 to 5 parts by weight per 100 parts by weight of the sum of components (A) and (B).

For improving adhesive properties of the composition, the latter may contain an adhesion promoter. The adhesion promoter may comprise an organic silicon compound that contains in one molecule at least one silicon-bonded alkoxy group. Such an alkoxy group may be represented by methoxy, ethoxy, propoxy, butoxy, and methoxyethoxy groups, with methoxy groups being particularly preferred. Examples of silicon-bonded organic groups other than alkoxy groups contained in the organic silicon compound are the aforementioned alkyl groups, alkenyl groups, aryl groups, aralkyl, halogen-substituted alkyl groups, or other optionally substituted monovalent hydrocarbon groups; 3-glycidoxypropyl, 4-glycidoxybutyl, and other glycidoxyalkyl groups, 2-(3,4-epoxycyclohexyl)ethyl, 3-(3,4-epoxycyclohexyl)propyl, and other epoxycyclohexyl alkyl groups; 4-oxiranylbutyl, 8-oxiranyloctyl, and other oxiranylalkyl groups; or similar epoxy-containing monovalent organic groups; 3-methacryloxypropyl, or other acryl-containing monovalent organic groups. Other examples include hydrogen atoms. Preferably, such organic silicon compounds contain groups reactive with components (A) or (B). e.g., alkenyl groups or silicon-bonded hydrogen atoms. From the viewpoint of improved adhesion to various substrates, it is recommended to use the organic silicon compounds that contain in one molecule at least one epoxy-containing organic group.

The above-mentioned organic silicon compounds can be exemplified by organosilane compounds or organosiloxane oligomers. The organosiloxane oligomers may have a linear, partially-branched linear, branched, cyclic, or net-like molecular structure. Most preferable are linear, branched, or netlike molecular structure. Such organic silicon compounds can be exemplified by 3-glycidoxypropyl trimethoxysilane, 2-(3,4-epoxycyclohexyl)ethyltrimethoxysilane, 3-methacryloxypropyl trimethoxysilane, or a similar silane compound; a siloxane compound that contains in one molecule at least one alkenyl group, or at least one silicon-bonded hydrogen atom and silicon-bonded alkoxy group; or a mixture of a silane compound or a siloxane compound that contains at least one silicon-bonded alkoxy group with a siloxane compound that contains in one molecule at least one silicon-bonded hydroxy group and at least one alkenyl group; siloxane compounds represented by the following formula:

[First Chemical Formula]

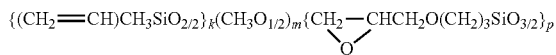

(wherein "k", "m", and "p" are positive numbers),
or siloxane compounds represented by the following formula:

[Second Chemical Formula]

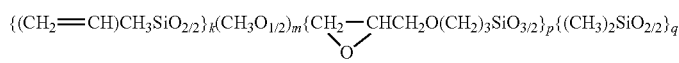

(wherein "k", "m", "p", and "q" are positive numbers).

It is recommended that the adhesive promoter be in the form of a low-viscosity liquid. Although there are no special requirements with regard to viscosity of this component, it is recommended that at 25° C. viscosity be in the range of 1 to 500 mPa·s. Also, there are no special restrictions with regard to amounts in which the adhesion promoter can be added to the composition. It can be recommended, however, to add this component in an amount of 0.01 to 10 parts by weight per 100 parts by weight of the total weight of the composition.

Within the limits which are not in contradiction with the objects of the invention, the composition may contain other arbitrary components such as silica, glass, alumina, zinc oxide, or similar inorganic fillers; polymethacrylate resin, or similar fine powdered organic resins; heat-resistant agents, dyes, pigments, flame retardancy-imparting agents, solvents, etc.

The composition of the invention can be cured a room temperature or with heating. Heating is used for acceleration of curing. The heating temperature should be in the range of 50 to 250° C. A cured product obtained from the composition is obtained in the form of rubber, particular, hard rubber, or resin that possesses flexibility.

It is recommended that in a visible light (589 nm) a cured product of the invention should have an index of refraction (at 25° C.) equal to or greater than 1.5. It is also recommended that a cure product of the invention should have a transmittance (at 25° C.) equal to or greater than 80%. This is because it will be impossible to guarantee that semiconductor devices that contain semiconductor elements coated with cured bodies of the invention having an index of refraction lower than 1.5 or at transmittance lower than 80% will reliably operate. In order to obtain a curable organopolysiloxane composition capable of forming a cured product having a high index of refraction and high transmittance, it is necessary that all the components of the composition have approximately the same index of refraction. The index of refraction can be measured, e.g., with the use of an Abbe refractometer. By adjusting the wavelength of light in the Abbe refractometer, it is possible to measure the index of refraction at any wavelength.

The index of refraction of a cured product can also be determined, e.g., by measuring refraction of a cured product with an optical path of 1.0 mm with the use of a spectrophotometer. It is recommended that the ultraviolet-ray transmittance (at 25° C.) of a cured product in the wavelength range of 200 nm to 250 nm be equal to or lower than 10%. In case a semiconductor device having a semiconductor element coated with a cured body of the invention receive ultraviolet rays in a short wavelength range of 200 to 250 nm, it will be impossible to protect the material of this semiconductor device from deterioration. Such ultraviolet-ray transmittance can be measured on a 1.0 mm wavelength cured body with the use of a spectrophotometer.

EXAMPLES

The curable organopolysiloxane composition of the invention and a cured product of the composition will be further described with reference to practical and comparative examples. In these examples, viscosity values were measured at 25° C. The weight-average molecular weight was obtained by using THF as a solvent and presented in values recalculated with reference to polystyrene and measured with the use of gel-permeation chromatography (hereinafter referred to as "GPC").

[Storage Modulus of Elasticity and Glass-Transition Point ($T_g$) of Cured Product]

The curable organopolysiloxane composition was de-gassed, poured into a mold having 10 mm width, 50 mm length, and 2 mm depth, subjected to pressure molding for 60 min. at a temperature of 150° C. and a pressure of 2.5 MPa, and then formed into a cured-product specimen after subsequent secondary heating for 2 hours in an oven at 180° C.

The index of dynamic viscoelasticity inherent in the obtained specimen was measured with the use of a viscoelasticity analyzer ARES of Rheometric Scientific, Inc. (Model RDA700). The storage modulus of elasticity and tan δ were determined in the temperature range of −150° C. to +250° C. with the heating rate of 3° C. per minute at 1 Hz oscillation and 0.05% twist. The glass transition point ($T_g$) of the cured product was determined from the value of tan δ.

[Cured Product Appearance]

Appearance of the cured product was evaluated by visual inspection.

[Cured-Product Transmittance]

A cured product was manufactured by curing the curable organopolysiloxane composition by heating it for 1 hour at 150° C. in a hot-air-circulation oven. The obtained cured product (having 1.0 mm optical path) was used for measuring transmittance at 25° C.

Reference Example 1

A mixture was prepared by mixing 183.69 parts by weight of a 54.4 wt. % toluene solution of an organopolysiloxane (weight-average molecular weight=1,600; vinyl-group content=5.6 wt. %) which was solid at 25° C. and is represented by the following average unit formula:

$(C_6H_5SiO_{3/2})_{0.75}[(CH_2=CH)(CH_3)_2SiO_{1/2}]_{0.25}$ with 13.68 parts by weight of a dimethylpolysiloxane represented by the following formula:

$H(CH_3)_2SiO[(CH_3)_2SiO]_{20}Si(CH_3)_2H$ (this component contained 0.08 moles of silicon-bonded hydrogen atoms per 1 mole of vinyl groups contained in the aforementioned organopolysiloxane). Water was removed from the mixture as an azeotrope with toluene by heating the mixture. After the mixture was cooled to room temperature, the product was mixed with a platinum-1,3-divinyl-1,1,3,3-tetramethyldisiloxane complex (contained in the composition in such an amount that, in terms of weight units, the content of metallic platinum in the complex was 5 ppm). The mixture was then slowly heated and mixed for 1 hour at a temperature of 103° C. to 107° C. The solution turned into a condition between transparency and semi-transparency with white turbidity. Toluene was removed with heating at 130° C. under a reduced pressure from 1 mmHg to 5 mmHg and then the product was cooled to produce an organopolysiloxane, which was solid and semi-transparent at 25° C. and was obtained with a yield of 98% (weight-average molecular weight=2,600; vinyl-group content=4.8 wt. %).

Reference Example 2

A mixture was prepared by mixing 187.81 parts by weight of a 54.4 wt. % toluene solution of an organopolysiloxane (weight-average molecular weight=1,600; vinyl-group content=5.6 wt. %) which was solid at 25° C. and is represented by the following average unit formula:

$(C_6H_5SiO_{3/2})_{0.75}[(CH_2=CH)(CH_3)_2SiO_{1/2}]_{0.25}$ with 27.55 parts by weight of a dimethylpolysiloxane represented by the following formula:

$H(CH_3)_2SiO[(CH_3)_2SiO]_{20}Si(CH_3)_2H$ (this component contained 0.16 moles of silicon-bonded hydrogen atoms per 1 mole of vinyl groups contained in the aforementioned organopolysiloxane). Water was removed from the mixture as an azeotrope with toluene by heating the mixture. After the mixture was cooled to room temperature, the product was mixed with a platinum-1,3-divinyl-1,1,3,3-tetramethyldisiloxane complex (contained in the composition in such an amount that, in terms of weight units, the content of metallic platinum in the complex was 5 ppm). The mixture was then slowly heated and mixed for 1 hour at a temperature of 103° C. to 107° C. The solution turned into condition between transparency and semi-transparency with white turbidity. Toluene was removed with heating at 130° C. under a reduced pressure from 1 mmHg to 5 mmHg and then the product was cooled to produce an organopolysiloxane, which at 25° C. comprised a viscous substance and was semi-transparent. The product was obtained with a yield of 99% {weight-average molecular weight=8,400 and 1,550 (at GPC area ratio of 16:68); vinyl-group content=4.4 wt. %}.

Reference Example 3

A mixture was prepared by mixing 181.90 parts by weight of a 54.4 wt. % toluene solution of an organopolysiloxane (weight-average molecular weight=1,600; vinyl-group content=5.6 wt. %) which was solid at 25° C. and is represented by the following average unit formula:

$(C_6H_5SiO_{3/2})_{0.75}[(CH_2=CH)(CH_3)_2SiO_{1/2}]_{0.25}$ with 47.89 parts by weight of a dimethylpolysiloxane represented by the following formula:

$H(CH_3)_2SiO[(CH_3)_2SiO]_{20}Si(CH_3)_2H$ (this component contained 0.28 moles of silicon-bonded hydrogen atoms per 1 mole of vinyl groups contained in the aforementioned organopolysiloxane). Water was removed from the mixture as an azeotrope with toluene by heating the mixture. After the mixture was cooled to room temperature, the product was mixed with a platinum-1,3-divinyl-1,1,3,3-tetramethyldisiloxane complex (contained in the composition in such an amount that, in terms of weight units, the content of metallic platinum in the complex was 5 ppm). The mixture was then slowly heated and mixed for 1 hour at a temperature of 103° C. to 107° C. The solution turned into condition between transparency and semi-transparency with white turbidity. Toluene was removed with heating at 130° C. under a reduced pressure from 1 mmHg to 5 mmHg and then the product was cooled to produce an organopolysiloxane, which at 25° C. comprised a viscous substance and was semi-transparent. The product was obtained with a yield of 99% {weight-average molecular weight=11,000 and 1,400 (at GPC area ratio of 43:48); vinyl-group content=3.9 wt. %}.

Practical Example 1

A curable organopolysiloxane composition was prepared by uniformly mixing 77.4 parts by weight of the organopolysiloxane obtained in Reference Example 1, 22.6 parts by weight of an organohydrogenpolysiloxane that had viscosity of 950 mPa·s and is represented by the following average unit formula:

$(C_6H_5SiO_{3/2})_{0.40}[(CH_3)_2HSiO_{1/2}]_{0.60}$ (this component contained 1.1 moles of silicon-bonded hydrogen atoms per 1 mole of the aforementioned organopolysiloxane), and a platinum-1,3-divinyl-1,1,3,3-tetramethyldisiloxane complex (contained in the composition in such an amount that, in terms of weight units, the content of metallic platinum in the complex was 2 ppm). Following this, the obtained composition was used for manufacturing a cured product by curing the composition under appropriate conditions. Characteristics of the obtained cured product are shown in Table 1.

Practical Example 2

A curable organopolysiloxane composition was prepared by uniformly mixing 80.9 parts by weight of the organopolysiloxane obtained in Reference Example 2, 19.1 parts by weight of an organohydrogenpolysiloxane that had viscosity of 950 mPa·s and is represented by the following average unit formula:

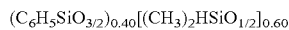
$(C_6H_5SiO_{3/2})_{0.40}[(CH_3)_2HSiO_{1/2}]_{0.60}$ (this component contained 1.0 mole of silicon-bonded hydrogen atoms per 1 mole of vinyl groups contained in the aforementioned organopolysiloxane), and a platinum-1,3-divinyl-1,1,3,3-tetramethyldisiloxane complex (contained in the composition in such an amount that, in terms of weight units, the content of metallic platinum in the complex was 2 ppm). Following this, the obtained composition was used for manufacturing a cured product by curing the composition under appropriate conditions. Characteristics of the obtained cured product are shown in Table 1.

Practical Example 3

A curable organopolysiloxane composition was prepared by uniformly mixing 85.2 parts by weight of the organopolysiloxane obtained in Reference Example 3, 19.1 parts by weight of an organohydrogenpolysiloxane that had viscosity of 950 mPa·s and is represented by the following average unit formula:

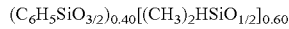
$(C_6H_5SiO_{3/2})_{0.40}[(CH_3)_2HSiO_{1/2}]_{0.60}$ (this component contained 0.8 moles of silicon-bonded hydrogen atoms per 1 mole of vinyl groups contained in the aforementioned organopolysiloxane), and a platinum-1,3-divinyl-1,1,3,3-tetramethyldisiloxane complex (contained in the composition in such an amount that, in terms of weight units, the content of metallic platinum in the complex was 2 ppm). Following this, the obtained composition was used for manufacturing a cured product by curing the composition under appropriate conditions. Characteristics of the obtained cured product are shown in Table 1.

Comparative Example 1

A curable organopolysiloxane composition was prepared by uniformly mixing 73.5 parts by weight of the organopolysiloxane (weight-average molecular weight=1,600) which is solid at 25° C. and is represented by the following average unit formula:

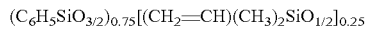
$(C_6H_5SiO_{3/2})_{0.75}[(CH_2\!\!=\!\!CH)(CH_3)_2SiO_{1/2}]_{0.25}$ 26.5 parts by weight of an organohydrogenpolysiloxane that had viscosity of 950 mPa·s and is represented by the following average unit formula:

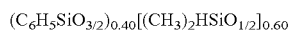
$(C_6H_5SiO_{3/2})_{0.40}[(CH_3)_2HSiO_{1/2}]_{0.60}$ (this component contained 1.1 moles of silicon-bonded hydrogen atoms per 1 mole of the aforementioned organopolysiloxane), and a platinum-1,3-divinyl-1,1,3,3-tetramethyldisiloxane complex (contained in the composition in such an amount that, in terms of weight units, the content of metallic platinum in the complex was 2 ppm). Following this, the obtained composition was used for manufacturing a cured product by curing the composition under appropriate conditions. Characteristics of the obtained cured product are shown in Table 1.

TABLE 1

| Properties | | Examples | | | Comparative Examples Comp. Ex. 1 |
|---|---|---|---|---|---|
| | | Present Invention | | | |
| | | Pr. Ex. 1 | Pr. Ex. 2 | Pr. Ex. 3 | |
| Storage Modulus of Elasticity (MPa) | 25° C. | 410 | 222 | 120 | 468 |
| | 100° C. | 90 | 44 | 20 | 111 |
| | 200° C. | 72 | 27 | 16 | 130 |
| Tg (° C.) | | 49 | 52 | 57 | 59 |
| Appearance | | Transparent | | | |
| Transmittance (%) | | 98 | 98 | 98 | 98 |

INDUSTRIAL APPLICABILITY

Since curing of the curable organopolysiloxane of the present invention at room temperature or with heating makes it possible to manufacture a cured product that possesses a desirable modulus of elasticity, the composition of the invention may find use as an adhesive agent, potting agent, protective-coating agent, underfill agent, etc., for electrical and electronic applications. In view of high optical transmittance of cured products obtained from the composition of the invention, the composition is especially suitable for use as an adhesive agent, potting agent, protective-coating agent, and an underfill agent for semiconductor elements of optical applications.

The invention claimed is:
1. A curable organopolysiloxane composition comprising:
(A) a solvent-soluble organopolysiloxane obtained by conducting a hydrosilylation reaction between
  (i) an organopolysiloxane that contains in one molecule at least two alkenyl groups and is represented by the following average structural formula:

  $R^1_aSiO_{(4-a)/2}$ (wherein $R^1$ represents a substituted or unsubstituted monovalent hydrocarbon group, the content of alkenyl groups in all groups represented by $R^1$ is within the range of 0.1 to 40 mole %, and "a" is a positive number that satisfies the following condition: $1 \leq a < 2$), and
  (ii) a diorganopolysiloxane represented by the following general formula:

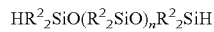
  $HR^2_2SiO(R^2_2SiO)_nR^2_2SiH$ (wherein $R^2$ designates substituted or unsubstituted monovalent hydrocarbon groups that can be identical or different and that are free of unsaturated aliphatic bonds, and "n" is an integer ranging from 0 to 1,000) {constituent (ii) is used in such an amount that the content of silicon-bonded hydrogen atoms of this constituent is less than 1 mole per 1 mole of alkenyl groups of constituent (i)}, the reaction being carried out in the presence of (iii) a hydrosilylation catalyst;
(B) an organohydrogenpolysiloxane represented by the following average structural formula:

$R^2_bH_cSiO_{(4-b-c)/2}$ (wherein $R^2$ is the same as defined above, and "b" and "c" are positive numbers that satisfy the following conditions: $0.7 \leq b \leq 2.1$; $0.001 \leq c \leq 1.0$; and $0.8 \leq (b+c) \leq 2.6$); {component (B) is used in such an amount that the content of silicon-bonded hydrogen atoms of this component is in the range of 0.1 to 10 moles per 1 mole of alkenyl groups of component (A)}; and (C) a hydrosilylation catalyst used in a catalytic amount.

2. The curable organopolysiloxane composition of claim 1, wherein the content of aryl groups in all groups represented by $R^1$ of constituent (i) is at least 10 mole %.

3. The curable organopolysiloxane composition of claim 2, wherein the alkenyl groups of constituent (i) are vinyl or allyl groups, and the aryl groups of constituent (i) are phenyl groups.

4. The curable organopolysiloxane composition of claim 2, wherein groups represented by $R^2$ of constituent (ii) are methyl groups.

5. The curable organopolysiloxane composition of claim 1, wherein groups represented by $R^2$ of constituent (ii) are methyl groups.

6. The curable organopolysiloxane composition of claim 1, wherein constituent (ii) participates in reaction with constituent (i) in such an amount that 0.05 to 0.95 moles of silicon-bonded hydrogen atoms of constituent (ii) are used per 1 mole of alkenyl groups of constituent (i).

7. A cured product obtained by curing the curable organopolysiloxane composition according to claim 1.

8. The cured product of claim 7 having an index of refraction equal to or greater than 1.5 at 25° C. in visible light.

9. The cured product of claim 7 having an optical transmittance equal to or greater than 80% at 25° C.

10. The cured product of claim 7 having an ultraviolet-ray transmittance equal to or lower than 10% at 25° C. in the wavelength range of 200 nm to 250 nm.

11. The curable organopolysiloxane composition of claim 1, wherein groups represented by $R^2$ of constituent (ii) are alkyl groups.

* * * * *